(No Model.)

B. F. KELLOGG.
GAME.

No. 391,715. Patented Oct. 23, 1888.

WITNESSES
Edwin L. Bradford
J. B. Keefer

Benjamin F. Kellogg
INVENTOR
by
HIS ATTORNEY

UNITED STATES PATENT OFFICE.

BENJAMIN F. KELLOGG, OF FALL RIVER, MASSACHUSETTS.

GAME.

SPECIFICATION forming part of Letters Patent No. 391,715, dated October 23, 1888.

Application filed June 12, 1888. Serial No. 276,899. (No model.)

*To all whom it may concern:*

Be it known that I, BENJAMIN F. KELLOGG, a citizen of the United States, residing at Fall River, in the county of Bristol and State of Massachusetts, have invented certain new and useful Improvements in Games; and I do hereby declare the following to be a full, clear, and exact description of the invention, such as will enable others skilled in the art to which it appertains to make and use the same.

The invention relates to games and toys.

The object of the invention is to produce a game of such a nature as to make itself interesting, particularly during the time of general elections, by reason of its representing and dealing with the electoral votes and their number possessed by different counties or States.

The invention resides, essentially, in a play-board of suitable material—such as wood, pasteboard, paper, or the like—having upon it the representation of the United States, or of an individual State or county, with the political divisions thereof suitably denoted and each one numbered, the map being surrounded by a border having divisions numbered from 0 upward to any desired number, the men each having a number corresponding to a number placed upon a political division, and also a number denoting the number of the electoral votes possessed by the division.

I have illustrated the invention in the accompanying drawings, in which—

Figure 1:
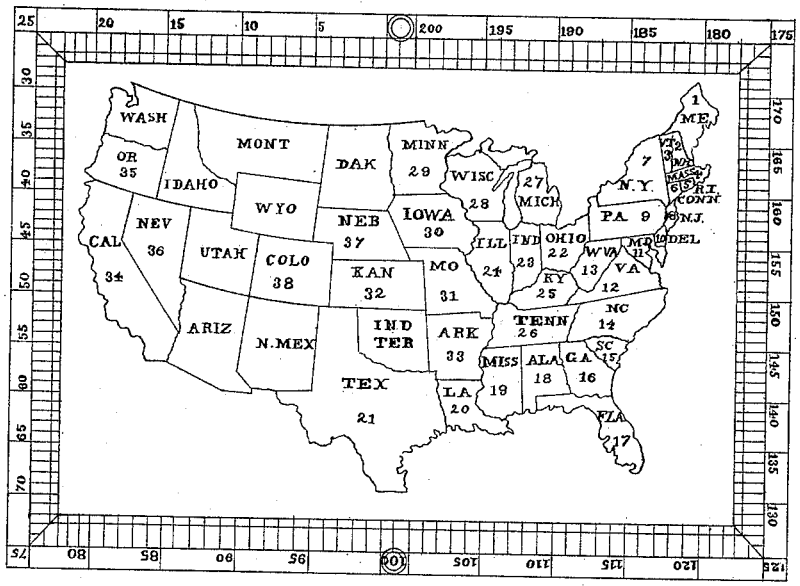
Figure 2:
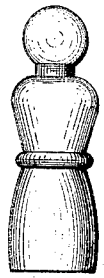
Figure 3:

Figure 1 represents a play-board incorporating my idea, the States of the United States being represented, and each one designated by a suitable number; and Fig. 2 represents a counter or a representation of a candidate, designed to be moved around the margin of the board to designate the number of votes obtained. Fig. 3 represents one of the men bearing a number corresponding to the number of one of the political divisions, and also a number indicating the number of electoral votes of that division.

The purpose of the scale is, in connection with the counters, to designate the number of the electoral votes won during the course of the game by the opposing candidates.

Both men are placed at the starting-point, and as points are made by the players the respective counters are moved along toward the terminus, the first one reaching the final point being the winner.

The game may be played by either two or four persons. When played by two persons, it is as follows: The men are mixed and arranged in any way so that the number cannot be seen by the players. One man each is drawn to determine the lead, and then each player draws six men from the pile. The one entitled to play first places one of his men so that the number can be seen. The other player can take it with any one of his men which represents a State having a larger number—the man representing the largest-numbered State, not the State having the largest number of votes. If he captures, he places the captured man on the State represented by it, and moves the counter on the margin the number of points of the electoral votes of that State, as shown by the number on the man. The man with which he captures it is placed in the general pile to be drawn again. If he cannot capture, or does not desire to do so, he plays any one of his men he chooses which has a lower number than that of his opponent's number, the man so played being captured by the first player. This captured man is in this instance placed upon a figure which represents its division. The number of points it is entitled to by the electoral vote of the captured man are scored on the margin, and the man that captures it is placed back into the general pile. When the men originally drawn have in this manner been exhausted, they each draw six more, and proceed as before, and so on until the game is won by the counter of one or the other player reaching the goal.

Having thus fully described my invention, what I claim as new, and desire to secure by Letters Patent, is—

1. A game consisting, essentially, of a map having the political divisions of the country or a section of a country represented thereon, each division being numbered, and men each bearing a number corresponding to the number of a division, and also a number denoting the electoral vote of such division, substantially as described.

2. A game consisting, essentially, of a map of all or a portion of a country, having political divisions denoted as shown, and each division being numbered, a border or scale numbered from 0 to a climax, and men bearing numbers corresponding to those of the political divisions, and numbers representing the electoral vote of the division and counters, substantially as described.

In testimony whereof I affix my signature in presence of two witnesses.

BENJAMIN F. KELLOGG.

Witnesses:
ARBA N. LINCOLN,
GEORGE F. WOOD.